United States Patent
Ganesan et al.

(10) Patent No.: US 11,850,750 B1
(45) Date of Patent: Dec. 26, 2023

(54) PORTABILITY FRAMEWORK FOR ROBOTIC PROCESS AUTOMATION

(71) Applicant: NTT DATA Services, LLC, Plano, TX (US)

(72) Inventors: Dhurai Ganesan, Chennai (IN); Sankar Chandrasekaran, Chennai (IN); Ujjwal Sharma, Chennai (IN); Harsh Vinayak, Gurgaon (IN); Tanvir Khan, Allen, TX (US)

(73) Assignee: NTT DATA Services, LLC, Plano, TX (US)

(*) Notice: Subject to any disclaimer, the term of this patent is extended or adjusted under 35 U.S.C. 154(b) by 1086 days.

(21) Appl. No.: 16/588,349

(22) Filed: Sep. 30, 2019

(51) Int. Cl.
  *B25J 9/16* (2006.01)
  *G06N 20/00* (2019.01)
  *G06F 9/455* (2018.01)
  *G06F 9/48* (2006.01)

(52) U.S. Cl.
  CPC .............. *B25J 9/163* (2013.01); *G06F 9/455* (2013.01); *G06N 20/00* (2019.01); *G06F 9/45558* (2013.01); *G06F 9/485* (2013.01)

(58) Field of Classification Search
  CPC ...... B25J 9/163; G06F 9/455; G06F 9/45558; G06F 9/485; G06N 20/00
  See application file for complete search history.

(56) References Cited

U.S. PATENT DOCUMENTS

| | | | |
|---|---|---|---|
| 8,327,373 B2 | 12/2012 | Srinivasan | |
| 9,882,824 B2 | 1/2018 | Maes et al. | |
| 10,152,387 B1* | 12/2018 | Chakraborty | G06F 11/1469 |
| 10,853,111 B1* | 12/2020 | Gupta | G06F 9/45558 |
| 2015/0082290 A1* | 3/2015 | Peled | G06F 8/76 717/137 |
| 2015/0293773 A1* | 10/2015 | Cai | G06F 9/45558 718/1 |
| 2016/0239328 A1* | 8/2016 | Kaplan | G06F 9/45558 |
| 2016/0259665 A1* | 9/2016 | Gaurav | G06F 9/45558 |
| 2019/0310881 A1* | 10/2019 | Gupta | G06F 9/45533 |
| 2019/0340003 A1* | 11/2019 | Ramanathan | G06F 9/5077 |
| 2019/0361750 A1* | 11/2019 | Sequeira | H04L 9/3268 |
| 2020/0034211 A1* | 1/2020 | Kumar P | G06K 9/6223 |
| 2020/0348964 A1* | 11/2020 | Anand | G06F 9/5005 |

\* cited by examiner

*Primary Examiner* — Roberto Borja
(74) *Attorney, Agent, or Firm* — PATTERSON + SHERIDAN LLP (57) ABSTRACT

In an embodiment, a method of performance-enhanced machine-learning model creation is performed by a computer system. The method includes receiving a command to port a first bot from a first RPA platform to a second RPA platform, where the first bot executes a robotic process in a computing environment provided by a particular computer system using the first RPA platform. The method further includes extracting bot configurations for the first bot from the first RPA platform, where the bot configurations include an instruction set that at least partially defines the robotic process. The method also includes creating a second bot for the second RPA platform, where the creating includes transforming the instruction set to a format of the second RPA platform. In addition, the method includes deploying the second bot on the second RPA platform, wherein the deployed second bot executes the robotic process.

20 Claims, 3 Drawing Sheets

PORTABILITY FRAMEWORK FOR ROBOTIC PROCESS AUTOMATION

BACKGROUND

Technical Field

The present disclosure relates generally to the deployment and utilization of bots for automated tasks and more particularly, but not by way of limitation, to a portability framework for robotic process automation.

History of Related Art

Robotic process automation (RPA) platforms have a tendency to provide a framework for automating tasks without providing a way to move those tasks to a different platform.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, in an embodiment, a method of performance-enhanced machine-learning model creation is performed by a computer system. The method includes receiving a command to port a first bot from a first RPA platform to a second RPA platform, where the first bot executes a robotic process in a computing environment provided by a particular computer system using the first RPA platform. The method further includes extracting bot configurations for the first bot from the first RPA platform, where the bot configurations include an instruction set that at least partially defines the robotic process. The method also includes creating a second hot for the second RPA platform, where the creating includes transforming the instruction set to a format of the second RPA platform. In addition, the method includes deploying the second bot on the second RPA platform, wherein the deployed second bot executes the robotic process.

In another general aspect, in an embodiment, a system includes a processor and memory, where the processor and memory in combination are operable to implement a method. The method includes receiving a command to port a first bot from a first RPA platform to a second RPA platform, where the first bot executes a robotic process in a computing environment provided by a particular computer system using the first RPA platform. The method further includes extracting bot configurations for the first bot from the first RPA platform, where the bot configurations include an instruction set that at least partially defines the robotic process. The method also includes creating a second bot for the second RPA platform, where the creating includes transforming the instruction set to a format of the second RPA platform. In addition, the method includes deploying the second bot on the second RPA platform, wherein the deployed second bot executes the robotic process.

In another general aspect, in an embodiment, a computer-program product includes a non-transitory computer-usable medium having computer-readable program code embodied therein, the computer-readable program code adapted to be executed to implement a method. The method includes receiving a command to port a first bot from a first RPA platform to a second RPA platform, where the first bot executes a robotic process in a computing environment provided by a particular computer system using the first RPA platform. The method further includes extracting bot configurations for the first bot from the first RPA platform, where the bot configurations include an instruction set that at least partially defines the robotic process. The method also includes creating a second bot for the second RPA platform, where the creating includes transforming the instruction set to a format of the second RPA platform. In addition, the method includes deploying the second bot on the second RPA platform, wherein the deployed second bot executes the robotic process.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

Robotic process automation (RPA) is the use of software, typically in combination with artificial intelligence (AI) and machine learning (ML) capabilities, to handle high-volume sequences of repeatable tasks that previously required humans to perform. These tasks can include, but are not limited to, queries, calculations, maintenance of records and transactions, web automations, remote operations, database functions, terminal connections, desktop operations, text operations, mouse simulations, keyboard simulations, folder operations, file handlers, clipboard handlers, combinations of the foregoing and/or the like. RPA technology can mimic a human worker, for example, by logging into applications, entering data, calculating and completing tasks, and logging out.

RPA technology is not always part of an organization's information technology (IT) infrastructure, but can instead, sit on top of it, enabling an organization to implement RPA technology quickly and efficiently, without changing the existing infrastructure and systems. In various embodiments, a computing environment can include, for example, many hundreds or thousands of software agents, often referred to herein as "bots," that automatically perform robotic processes. In various cases, the sequence of computer-implemented tasks performed by each bot can be the same or different, or a combination thereof.

Although bots can provide greater efficiency via increased automation, bots introduce numerous technical problems, many of which relate to their creation and management. When a bot is built or created using an RPA platform, it is usually tightly coupled to the ecosystem of that RPA platform. The bot may use a run-time license provided by that RPA platform and, in many cases, can only be operated, orchestrated, controlled, and monitored using the tools provided by that RPA platform. This often means that if a given bot has been created using RPA Platform A, it is not possible to use the license, orchestration, monitoring or other tools of RPA Platform B, and vice versa. Most often, when organizations invest and use bots in production environments built using multiple RPA platforms, they need to keep using disconnected bot management and control tools from respective RPA platforms. If an organization decides to use only one RPA Platform going forward, there is no way to consolidate, for example, all bots running in production to a single RPA platform of choice.

Figure 1:
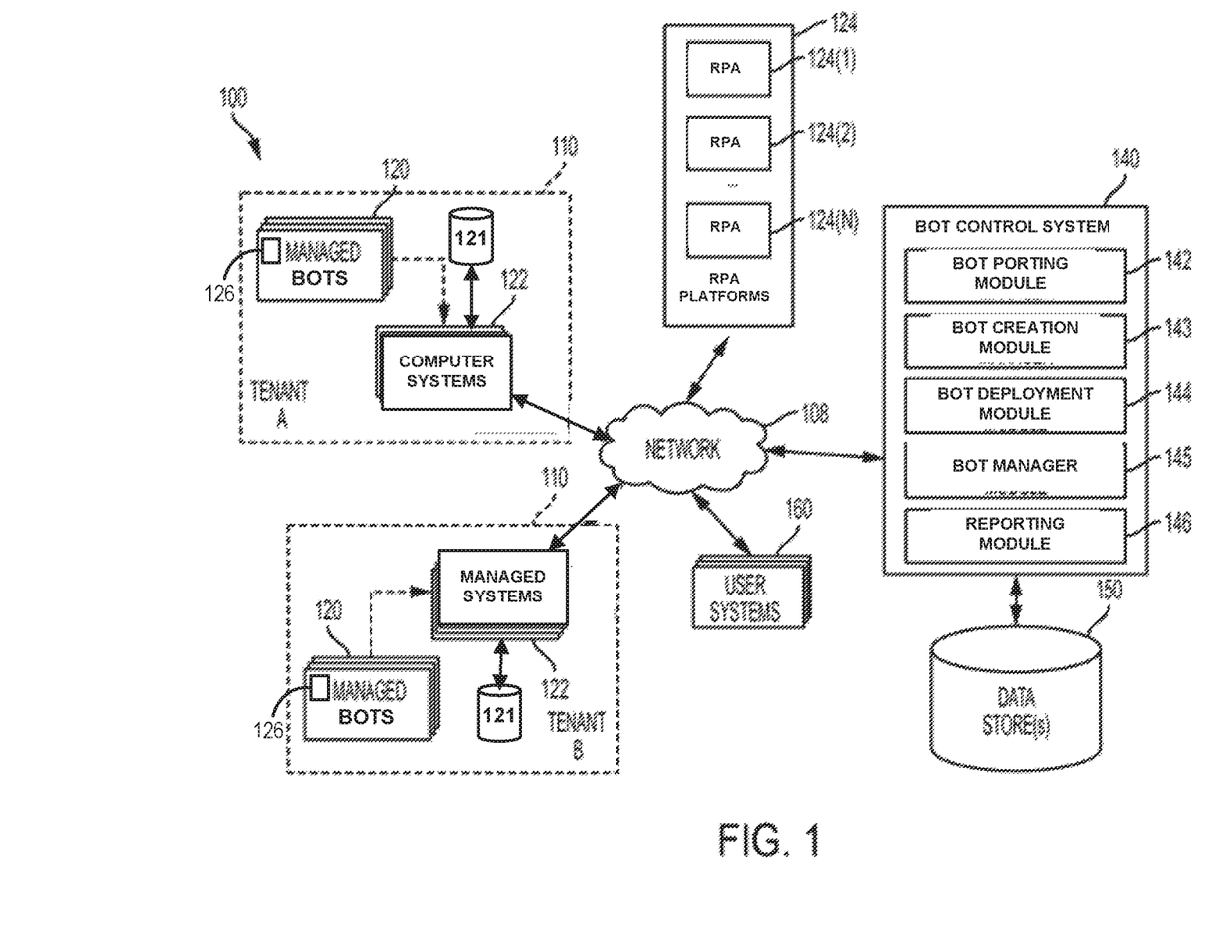
FIG. 1 illustrates an example of a system for implementing a bot control system.

FIG. 1 illustrates an example of a system 100 for implementing a bot control system 140 that can enable porting of bots between RPA platforms. The system 100 includes the bot control system 140, tenant systems 110, RPA platforms 124, user systems 160 and one or more data stores 150, each of which is operable to communicate over a network 108. The network 108 may be, or include, one or more of a private network, a public network, a local or wide area network, a portion of the Internet, combinations of the same, and/or the like.

In certain embodiments, the bot control system 140 can centrally manage bot deployments on the RPA platforms 124 for its tenants. The RPA platforms 124 are shown to include a RPA platform 124(1), a RPA platform 124(2) and a RPA platform 124(N). It should be appreciated that three RPA platforms are shown among the RPA platforms 124 only for illustrative purposes. In various implementations, any number of RPA platforms can be included among the RPA platforms 124. In a typical embodiment, the RPA platforms 124 each provide RPA software for creating and executing bots, generally using different RPA technology, interfaces and formats. In some cases, different versions of the same RPA platforms may be treated as different RPA platforms among the RPA platforms 124.

In particular, in the system 100, the tenant systems 110 can be served by the bot control system 140. In general, the tenant systems 110 can each be considered an abstraction of actual bot deployments managed by the bot control system 140 and the systems and data sources with which those bot deployments interact. For example, one of the tenant systems 110 is shown as owned or operated by "Tenant A" while another system 110 is owned or operated by a different tenant, "Tenant B." The tenant systems 110 shown can be owned or operated by the same or different entities. For example, Tenants A and B can represent customers (e.g., entities such as companies or individuals) of an operator of the bot control system 140. Although the term "tenant" is used herein to describe the tenant systems 110 or owners/operators thereof, in addition to having its ordinary meaning, the term "tenant" can, but need not, refer to tenancy in a multitenant software architecture.

The tenant systems 110 are each shown to include one or more managed bots 120, one or more computer systems 122 and one or more data sources 121. The one or more computer systems 122 can each provide a computing environment, inclusive of applications and corresponding user interfaces and dashboards, for executing configurable tasks. The one or more data sources 121 can include data streams or datasets that can be received or processed by the computer systems 122, potentially as part of executing the configurable tasks. In various cases, the one or more data sources 121 can be updated by the computer systems 122, or other components, in real-time, on a periodic basis, e.g., according to a schedule, on-demand or a combination of the same. In various cases, the tasks for which the computer systems 122 are configured can be executed in the respective computing environments, for example, by users of the user systems 160 and/or by the managed bots 120 as robotic processes. In a typical embodiment, the managed bots 120 are each deployed on an RPA platform of the RPA platforms 124 and interact as users in the computing environments of the computer systems 122 for purposes executing some or all of the configurable tasks as robotic processes.

The managed bots 120 can each include an instruction set 126 that can be used to provide the managed bots 120 a complete set of all computer-implemented tasks or steps that are to be performed in sequence automatically by the managed bots 120. In some embodiments, the instruction set 126 is in a machine-readable code that can be recognized and executed by a central processing unit. In various embodiments, the instruction set 126 can be made up of, for example, a markup language or data-interchange format such as extensible markup language (XML), extensible application markup language (XAML) or JavaScript Object Notation (JSON), a low-level programming language, a high-level programming language, a scripting language, a machine language, an assembly language or any combination thereof.

In the illustrated embodiment, the bot control system 140 can include a bot porting module 142, a bot manager 145, a bot deployment module 144, a reporting module 146 and a bot creation module 143. Each of these components can be implemented with hardware and/or software, including (optionally) virtual machines. In an example, the bot control system 140 can be implemented as a single management server. In another example, the bot control system 140 can be implemented in a plurality of virtual or physical servers, which may or may not be geographically co-located. In some embodiments, the bot control system 140 and/or other aspects of the system 100 may be hosted on a cloud-provider system.

In certain embodiments, features of the components of the bot control system 140 can be made accessible over an interface to the user systems 160. The user systems 160 can include any type of computing device, including information handling systems such as desktops, laptops, tablets, smartphones, and wearable or body-borne computers, to name a few. The user systems 160 can be operated by users, such as human users, associated with the tenants or by other users.

The bot porting module 142 is operable to receive and execute commands to port bots from a first or source platform of the RPA platforms 124 to a second or target platform of the RPA platforms 124. In various embodiments, the bot porting module 142 can facilitate individual bot porting and/or bulk bot porting, for example, so as to facilitate consolidation of all bots or bots of certain types or functionalities with certain RPA platforms of the RPA platforms 124. In addition, or alternatively, the bot porting module 142 can proceed with automatic mapping between formats of different platforms, user-guided mapping therebetween, or a combination thereof. Example operation of the bot porting module 142 will be described in greater detail relative to FIG. 3.

In certain embodiments, the bot porting module 142 uses and maintains in the data store(s) 150, for each of the RPA platforms 124 (or a subset thereof), configuration settings indicative of specific locations or paths where some or all of bot configurations for its bots reside and/or specific interfaces for retrieving some or all of the bot configurations. The bot configurations can include, for example, instruction sets similar to the instruction set 126. The bot configurations can further include, for example, connectivity information and/or login information for one or more of the computer systems 122 and/or data stores with which a given bot may interact to execute a robotic process. The bot configurations can further include, for example, exception handling procedures.

In certain embodiments, the bot porting module 142 uses and maintains mapping configurations in the data store(s) 150. The mapping configurations in the data store(s) 150 can map bot configurations, such as the example bot configurations described above, between different formats used by different RPA platforms of the RPA platforms 124. In general, the mapping configurations can map structures, tags and the like used by one RPA platform of the RPA platforms 124 to equivalent structures, tags, or combinations of the same used by another RPA platform of the RPA platforms 124. In some embodiments, the mapping configurations in the data store(s) 150 can use a standard or intermediate format to provide a common representation of functions, features, and configurations. The mapping configurations can map the structures, tags, or other configuration data of each of the RPA platforms 124, or a subset thereof, to the standard or intermediate format. In other embodiments, the mapping configurations in the data store(s) 150 can directly map between different formats of the different RPA platforms 124.

The above-described configuration settings and the mapping configurations in the data store(s) 150 can be developed and tuned using ML algorithms. For example, bot porting can involve user-guided mapping, which mapping is retained and used to train for automatic or recommendation-based mapping. Example ML algorithms include decision tree learning, association rule learning, artificial neural networks (including deep learning and, in particular, feed forward networks), inductive logic programming, support vector machines, clustering, Bayesian networks, K-nearest neighbors (K-NN) reinforcement learning, representation learning, similarity and metric learning, sparse dictionary learning, genetic algorithms, rule-based ML, gradient boosting, ML based on generalized linear modeling, random forest, ensemble learning, combinations of the foregoing and/or the like. Furthermore, in some embodiments, the bot porting module 142 can utilize, potentially in combination with one or more of the above-described learning algorithms, item-based and/or user-based collaborative filtering. In some embodiments, the bot porting module 142 can utilize other methods derived from dimensionality reduction, ensemble learning, instance-based algorithm, regression analysis, regularization algorithm, classifiers, and the like.

The bot creation module 143 can be utilized to create bots such as, for example, the managed bots 120. In some embodiments, an instruction set is created via the bot creation module 143 that contains all of the instructions and/or modules for a specific type of bot. The instruction set that is created can be similar to the instruction set 126 of each of the managed bots 120. In some cases, the bot creation module 143 can utilize information provided by the bot porting module 142 to automatically create an instruction set. In some embodiments, the bot creation module 143 includes or provides a configuration interface for manual creation of an instruction set, or for revision or tuning of an automatically created instruction set. The configuration interface can be accessible, for example, by the user systems 160.

In certain embodiments, the bot deployment module 144 can be utilized to deploy a bot on the RPA platforms 124 for a tenant, such that the deployed bot becomes one of the managed bots 120. In various embodiments, the bot deployment module 144 can utilize an instruction set created by the bot creation module 143 that can then be deployed. For example, the instruction set 126 of one of the managed bots 120 could be representative of a bot created by the bot creation module 143 and then deployed via the bot deployment module 144. In certain embodiments, the bot deployment module 144 can be used to deploy a single bot and/or a plurality of bots concurrently. In many cases, the bot deployment module 144 can be utilized to deploy bots on a variety of the RPA platforms 124. In some embodiments, the bot deployment module 144 can publish a configuration interface to the user systems 160, for example, for administrators, super users or other users (e.g., of a particular tenant) to select or specify such commands. In other embodiments, the bot deployment module 144 executes an automatic process to deploys bots without manual interaction. In various embodiments, the bot deployment module 144 can store command sets for some or all of the RPA platforms 124.

The bot manager 145 can serve to manage bots such as, for example, the managed bots 120, for tenants. In certain embodiments, the bot manager 145 can issue commands to control operation of bots. The bot manager 145 can be utilized to re-configure, optimize and/or customize any of the managed bots 120. For example, various commands can start or stop bots, perform configuration management, combinations of the same and/or the like. In some cases, the bot manager 145 can publish a configuration interface to the user systems 160, for example, for administrators, super users or other users (e.g., of a particular tenant) to select or specify such commands.

In some embodiments, bot porting module 142, the bot manager 145, or another component can serve as a point of contact for initiation of bot creation and deployment. In these embodiments, the bot porting module 142 or the bot manager 145 can control and cause execution, for example, of the bot creation module 143 and/or the bot deployment module 144. Example operation of various aspects and interactions of the bot porting module 142, the bot creation module 143, the bot deployment module 144, and the bot manager 145 will be described in relation to FIG. 3.

The reporting module 146 can generate regular or on-demand reports related to the managed bots 120. In various cases, these reports can provide a snapshot of some or all of the managed bots 120. The reporting module 146 can publish reports or other generated information, for example, to a web, and/or the like. The reporting module 146 can generate and execute a page, dashboard, and/or query of the data store(s) 150. The web page, user dashboard or other user interface(s) output, for example, by the reporting module 146, can be accessed by users of the user systems 160.

In general, the data store(s) 150 can include any information collected, stored or used by the bot control system 140. For example, in various embodiments, the data store(s) 150 can include configuration settings, mapping configurations, instruction sets for bots, command sets for one or more of the RPA platforms 124, deployment settings for bots (e.g., on a tenant-specific and/or bot-specific basis), metadata for bots to be deployed, data collected from the managed bots 120, combinations of the same and/or the like. In certain embodiments, data stored in the data store(s) 150 can take the form of repositories, flat files, databases, etc. In certain embodiments, the data store(s) 150 can be utilized as an event library, in which actions performed by any of the managed bots 120 and/or the user systems 160 are stored. The event library can also contain business rule libraries, exception libraries, control libraries, keyboard libraries, database libraries and/or cognitive libraries.

Figure 2:
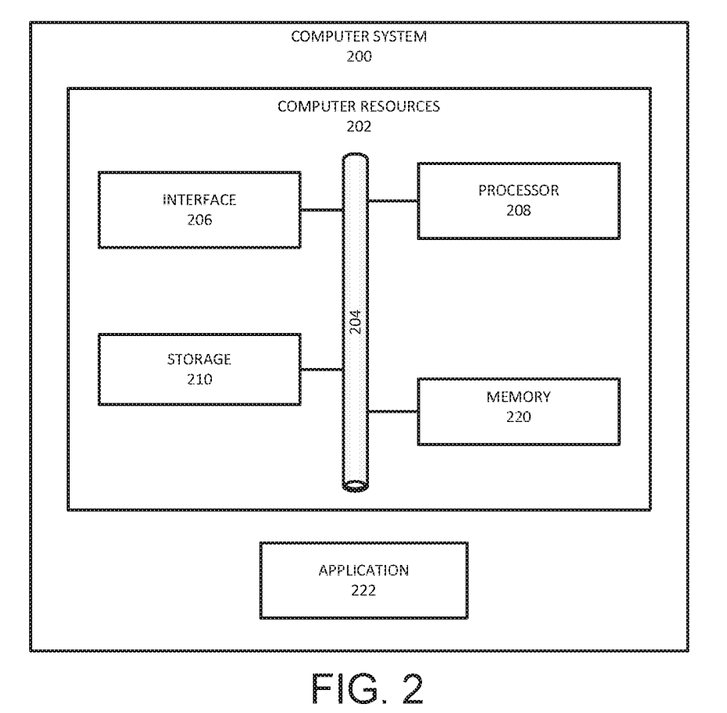
FIG. 2 illustrates an example of a computer system.

FIG. 2 illustrates an example of a computer system 200 that, in some cases, can be representative, for example, of the bot control system 140, the RPA platforms 124, the tenant systems 110, the user systems 160 and/or a module or sub-component of the foregoing. The computer system 200 includes an application 222 operable to execute on computer resources 202. The application 222 can be, for example, any of the systems or modules illustrated in FIG. 1. In particular embodiments, the computer system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 208, memory 220, storage 210, interface 206, and bus 204. Although a particular computer system is depicted having a particular number of particular components in a particular arrangement, this disclosure contemplates any suitable computer system having any suitable number of any suitable components in any suitable arrangement.

Processor 208 may be a microprocessor, controller, or any other suitable computing device, resource, or combination of hardware, software and/or encoded logic operable to execute, either alone or in conjunction with other components. (e.g., memory 220), the application 222. Such functionality may include providing various features discussed herein. In particular embodiments, processor 208 may include hardware for executing instructions, such as those making up the application 222. As an example, and not by way of limitation, to execute instructions, processor 208 may retrieve (or fetch) instructions from an internal register, an internal cache, memory 220, or storage 210; decode and execute them; and then write one or more results to an internal register, an internal cache, memory 220, or storage 210.

In particular embodiments, processor 208 may include one or more internal caches for data, instructions, or addresses. This disclosure contemplates processor 208 including any suitable number of any suitable internal caches, where appropriate. As an example, and not by way of limitation, processor 208 may include one or more instruction caches, one or more data caches, and one or more translation lookaside buffers (TLBs). Instructions in the instruction caches may be copies of instructions in memory 220 or storage 210 and the instruction caches may speed up retrieval of those instructions by processor 208. Data in the data caches may be copies of data in memory 220 or storage 210 for instructions executing at processor 208 to operate on; the results of previous instructions executed at processor 208 for access by subsequent instructions executing at processor 208, or for writing to memory 220, or storage 210; or other suitable data. The data caches may speed up read or write operations by processor 208. The TLBs may speed up virtual-address translations for processor 208. In particular embodiments, processor 208 may include one or more internal registers for data, instructions, or addresses. Depending on the embodiment, processor 208 may include any suitable number of any suitable internal registers, where appropriate. Where appropriate, processor 208 may include one or more arithmetic logic units (ALUs); be a multi-core processor; include one or more processors 208; or any other suitable processor.

Memory 220 may be any form of volatile or non-volatile memory including, without limitation, magnetic media, optical media, random access memory (RAM), read-only memory (ROM), flash memory, removable media, or any other suitable local or remote memory component or components. In particular embodiments, memory 220 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 220 may include one or more memories 220, where appropriate. Memory 220 may store any suitable data or information utilized by the computer system 200, including software embedded in a computer readable medium, and/or encoded logic incorporated in hardware or otherwise stored (e.g., firmware). In particular embodiments, memory 220 may include main memory for storing instructions for processor 208 to execute or data for processor 208 to operate on. In particular embodiments, one or more memory management units (MMUs) may reside between processor 208 and memory 220 and facilitate accesses to memory 220 requested by processor 208.

As an example, and not by way of limitation, the computer system 200 may load instructions from storage 210 or another source (such as, for example, another computer system) to memory 220. Processor 208 may then load the instructions from memory 220 to an internal register or internal cache. To execute the instructions, processor 208 may retrieve the instructions from the internal register or internal cache and decode them. During or after execution of the instructions, processor 208 may write one or more results (which may be intermediate or final results) to the internal register or internal cache. Processor 208 may then write one or more of those results to memory 220. In particular embodiments, processor 208 may execute only instructions in one or more internal registers or internal caches or in memory 220 (as opposed to storage 210 or elsewhere) and may operate only on data in one or more internal registers or internal caches or in memory 220 (as opposed to storage 210 or elsewhere).

In particular embodiments, storage 210 may include mass storage for data or instructions. As an example, and not by way of limitation, storage 210 may include a hard disk drive (HDD), a floppy disk drive, flash memory, an optical disc, a magneto-optical disc, magnetic tape, or a Universal Serial Bus (USB) drive or a combination of two or more of these. Storage 210 may include removable or non-removable (or fixed) media, where appropriate. Storage 210 may be internal or external to the computer system 200, where appropriate. In particular embodiments, storage 210 may be non-volatile, solid-state memory. In particular embodiments, storage 210 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 210 may take any suitable physical form and may comprise any suitable number or type of storage. Storage 210 may include one or more storage control units facilitating communication between processor 208 and storage 210, where appropriate.

In particular embodiments, interface 206 may include hardware, encoded software, or both providing one or more interfaces for communication (such as, for example, packet-based communication) among any networks, any network devices, and/or any other computer systems. As an example, and not by way of limitation, communication interface 206 may include a network interface controller (NIC) or network adapter for communicating with an Ethernet or other wire-based network and/or a wireless NIC (WNIC) or wireless adapter for communicating with a wireless network.

Depending on the embodiment, interface 206 may be any type of interface suitable for any type of network for which computer system 200 is used. As an example, and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 200 may include any suitable interface 206 for any one or more of these networks, where appropriate.

In some embodiments, interface 206 may include one or more interfaces for one or more I/O devices. One or more of these I/O devices may enable communication between a person and the computer system 200. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 206 for them. Where appropriate, interface 206 may include one or more drivers enabling processor 208 to drive one or more of these I/O devices. Interface 206 may include one or more interfaces 206, where appropriate.

Bus 204 may include any combination of hardware, software embedded in a computer readable medium, and/or encoded logic incorporated in hardware or otherwise stored (e.g., firmware) to couple components of the computer system 200 to each other. As an example, and not by way of limitation, bus 204 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 204 may include any number, type, and/or configuration of buses 204, where appropriate. In particular embodiments, one or more buses 204 (which may each include an address bus and a data bus) may couple processor 208 to memory 220. Bus 204 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 208 (such as, for example, one or more internal registers or caches), one or more portions of memory 220, one or more portions of storage 210, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C. Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3:
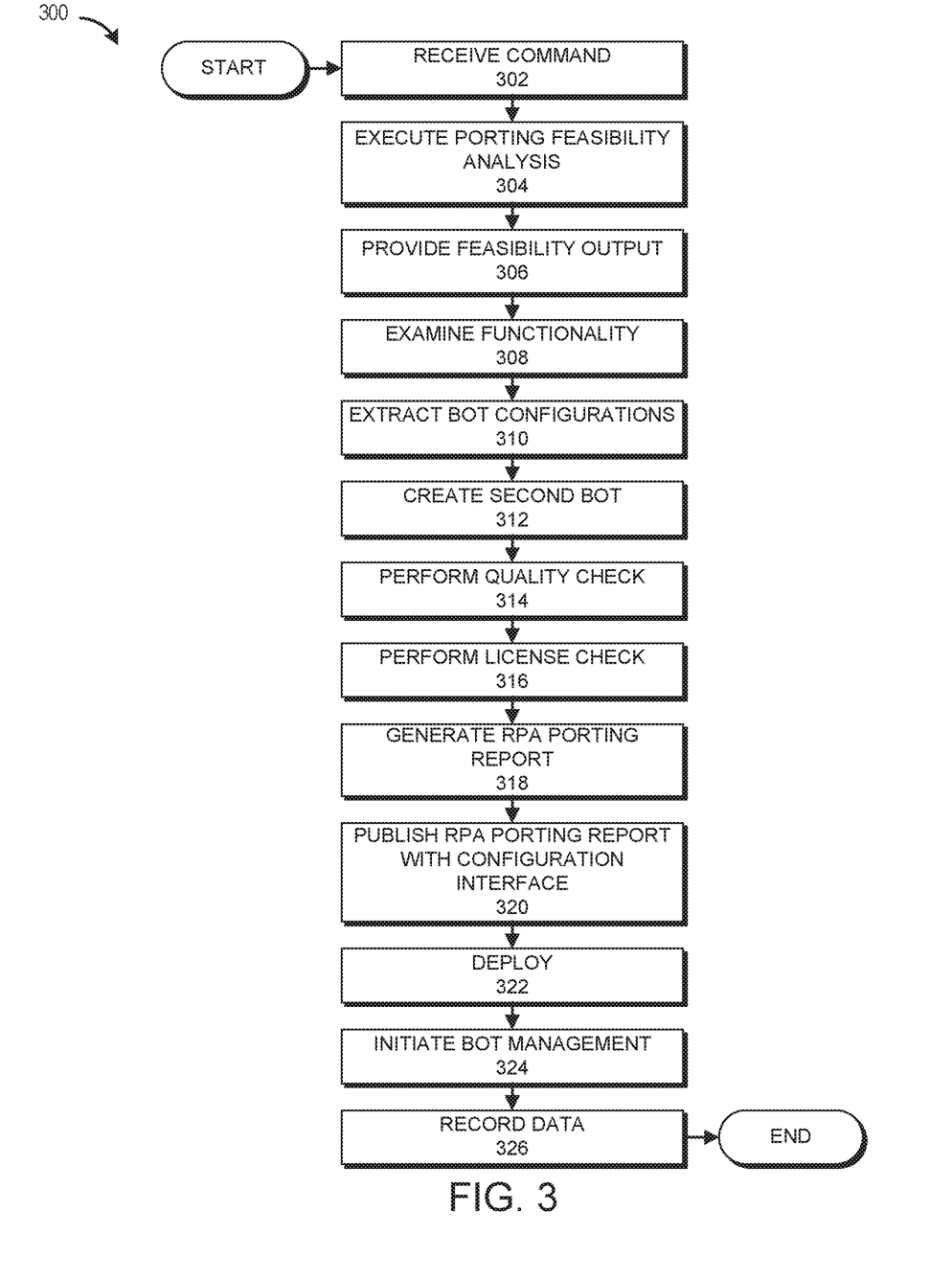
FIG. 3 illustrates an example of a process for porting bots.

FIG. 3 illustrates an example of a process 300 for porting bots. In certain embodiments, the process 300 can be implemented by any system that can process data. Although any number of systems, in whole or in part, can implement the process 300, to simplify discussion, the process 300 will be described in relation to particular components of the bot control system 140 of FIG. 1.

In some embodiments, the process 300 can executed in communication with a user of one of the user systems 160. In these embodiments, throughout the process 300, the user can be presented with a progress of the process 300 and be enabled to go backwards, exit the process 300, and/or pause. In various embodiments, porting progress for paused ports can be saved, along with related data, so that the port can be resumed at a later time.

At block 302, the bot porting module 142 receives a command to port a first bot from a first RPA platform to a second RPA platform. The command can be received, for example, from a user of one of the user systems 160. In general, the first bot can be one of the managed bots 120. In some cases, as part of the block 302, the bot porting module can receive a file representative of the first bot. For purposes of the example of FIG. 3, the first RPA platform is a source RPA platform on which the first bot has been deployed and the second RPA platform is a target platform to which the first bot is to be ported. In a typical embodiment, the command identifies the first bot by a unique identifier or using other information that is sufficient to distinguish the first bot from other bots among the managed bots 120. In some cases, the second RPA platform can be specified directly via the command or via a related command.

At block 304, the bot porting module 142 executes a porting feasibility analysis relative to the first and second RPA platforms. In certain embodiments, the block 304 involves the bot porting module 142 reaching a feasibility conclusion or recommendation relative to the command received at block 302 such as, for example: (1) automatic porting is possible; (2) porting is possible with manual configuration; and (3) porting is not possible. Other example conclusions and recommendations will be apparent to one skilled in the art after a detailed review of the present disclosure.

In some embodiments, the bot porting module 142 can reach its conclusion or recommendation at the block 304 by examining its mapping configurations, for example, in the data store(s) 150, for mapping from the first RPA platform to the second RPA platform. In an example, the bot porting module 142 can express its mapping configurations in the data store(s) 150 in terms of a standard or intermediate representation, such that the RPA platforms 124, or a subset thereof, can each have bot configuration elements mapped to the standard or intermediate representation. According to this example, with reference to the mapping configurations in the data store(s) 150, the bot porting module 142 can identify and quantify, for example, a set of bot configuration elements of the first RPA platform that are mapped to the standard or intermediate representation, a set of bot configuration elements of the second RPA platform that are mapped to the standard or intermediate representation, an extent to which the aforementioned sets of bot configuration elements overlap, combinations of the foregoing, and/or the like.

In an example, the bot porting module 142 can be configured to determine that porting is not possible under specified conditions such as, for example, if the mapping configurations in the data store(s) 150 include mappings for neither the first RPA platform nor the second RPA platform. In another example, the bot porting module 142 can be configured to determine that porting is not possible if the mapping configurations in the data store(s) 150 do not include mappings for at least one of the first and second RPA platforms. As another example, the bot porting module 142 can be configured to determine that porting is not possible if the first bot or the first RPA platform is not recognized.

In still another example, the bot porting module 142 can receive or define criteria regarding specific configuration elements of the standard or intermediate representation that must be mapped, in the mapping configurations in the data store(s) 150, to each of the first and second RPA platforms for porting to be deemed possible. In addition, or alternatively, the bot porting module 142 can receive or define criteria regarding a certain number of configuration elements that must be mapped to the standard or intermediate representation, where porting is deemed not possible if either the first or the second RPA platform fails to satisfy the criteria.

In yet another example, the bot porting module 142 can receive or define criteria regarding a number or proportion of a set of mapped configuration elements of the first RPA platform that must appear or be represented in a set of mapped configuration elements of the second RPA platform for porting to be deemed possible. It should be appreciated that the criteria can be different for different conclusions or recommendations. For instance, a standard for deeming automatic porting to be possible could be more stringent than a standard for deeming porting with manual configuration to be possible.

In certain embodiments, the bot porting module 142 can reach its conclusion or recommendation at the block 304 predictively by examining results of prior porting attempts. For example, as will be described in greater detail below, the bot porting module 142 can store, in the data store(s) 150, data related to a result of each execution of the process 300. According to this example, some of this data can include data indicative of whether porting was successful or unsuccessful and, for each successful port, whether the porting occurred with or without manual configuration. In these embodiments, the bot porting module 142 can use predictive analytics based on historical data to predict whether the port from the first RPA platform to the second RPA platform would be successful and whether the port would utilize manual configuration, where the prediction serves as the conclusion or result from the block 304. In some embodiments, the bot porting module 142 can apply confidence-level thresholding to resulting predictions.

At block 306, the bot porting module 142 provides a feasibility output to a user via, for example, the reporting module 146. In various embodiments, the feasibility output can include any of the information described above relative to the block 304. In various embodiments, the block 306 can include providing a user option to terminate the port (and the process 300) or identify a different RPA platform for the second RPA platform. In some cases, such as when the user identifies a different RPA platform for the second RPA platform, the process 300 can return to the block 304 for a new feasibility analysis relative to that platform.

At block 308, the bot porting module 142 examines functionality of the first bot. The examination can include, for example, determining or classifying a type of work, or robotic process, that is performed by the first bot. In some cases, the examination can involve inferring the functionality, for example, from a tenant associated with the first bot, or from a specific application, computer system, or data source with which the first bot interacts. In various embodiments, the examined functionality can conform, for example, to a taxonomy of possible functionalities. In addition, or alternatively, the examined functionality can involve determinations of a level of data security necessitated by the robotic process performed by the first bot.

Consider an example in which the first bot performs tasks related to medical claim processing. For example, if the first bot interacts with a computer system, among the computer systems 122, that provides a computing environment for medical claim processing, the first bot's functionality of performing medical claim processing can be inferred therefrom. In another example, if the first bot interacts with a computer system, among the computer systems 122, that receives or processes data streams or datasets that are known to be medical claims (e.g., as one of the one or more data sources 121), the first bot's functionality can similarly be inferred to be medical claims processing. In still another example, if the tenant is associated with particular functionality, such as medical claims processing, the first bot's functionality can likewise be inferred to be medical claims processing. Other examples will be apparent to one skilled in the art after a detailed review of the present disclosure.

At block 310, the bot porting module 142 extracts bot configurations for the first bot from the first RPA platform. As described previously, the data store(s) 150 can include configuration settings indicative of specific locations or paths where some or all of the bot configurations reside and/or specific interfaces for retrieving some or all of the bot configurations. In general, the extracted bot configurations include information that represents, in whole or in part, the first bot's implementation of the robotic process, so as to facilitate porting. In some embodiments, the bot porting module 142 can enable users to specify some or all of the bot configurations and/or paths, locations or interfaces for the same.

In an example, in various embodiments, the block 310 can include extracting the instruction set 126 of the first bot. In general, the instruction set 126 of the first bot at least partially defines the robotic process executed by the first bot. In some cases, a copy of the instruction set 126 can exist in the data store(s) 150 and can be extracted therefrom. In addition, or alternatively, the instruction set 126 of the first bot can be extracted from the first RPA platform according to a defined location or interface. In some cases, the instruction set 126 can be stitched together from multiple sets of information requested and received from the first RPA platform. As described previously, the extracted instruction set 126 of the first bot can exist in various formats, including a markup language or data-interchange format such as XML, XAML or JSON.

In various embodiments, the block 310 can include extracting connectivity information, login credentials and/or exception handling procedures related to the robotic process performed by the first bot. For example, the connectivity information, login credentials and/or exception handling procedures can correspond to a particular computer system of the computer systems 122 that provides a computing environment in which the first bot interacts as a user. In addition, or alternatively, the connectivity information, login credentials and/or exception handling procedures can relate to an application or resource in the computing environment. In some embodiments, the connectivity information, login credentials and/or exception handling procedures can relate to specific data sources of the one or more data sources 121. Other examples will be apparent to one skilled in the art after a detailed review of the present disclosure.

In some cases, some of the extracted information can be dependent, or based on, other extracted information. For example, via the extracted instruction set 126 of the first bot, information regarding applications and resources used by the first bot may be identified. Based, at least in part, on those identified applications and resources, connectivity information and/or login credentials for those applications and resources can be extracted from particular locations or via particular interfaces as described previously.

At block 312, the bot porting module 142 causes the bot creation module 143 to create a second bot for the second RPA platform using the extracted bot configurations and the mapping configurations in the data store(s) 150. Generally, the second bot represents a replication of the first hot that has been tailored to the second RPA platform. The block 312 can include transforming the instruction set for the first bot to a format of the second RPA platform. In various cases, the transformation can be different for different versions of the same RPA platform, where different versions of the same RPA platform can effectively be treated as different RPA platforms.

For example, the instruction set for the first bot can include translating a set of computer-implemented tasks, task sequence, and business rules in the instruction set into a new instruction set for the second RPA platform, where the new instruction set at least partially defines the second bot. In some embodiments, the transformation can involve translating the instruction set to an intermediate instruction set in the standard or intermediate format and then translating the intermediate instruction set to the new instruction set for the second RPA platform. In other embodiments, the bot porting module 142 can directly translate from the instruction set for the first bot to the new instruction set.

In some embodiments, the block 312 can be performed at least partially automatically by the bot porting module 142. In these embodiments, the bot porting module 142 can translate or map according to the mapping configurations in the data store(s) 150. In some embodiments, translations and mappings can be presented to the user as recommendations for approval prior to being executed. In some embodiments, the mapping configurations in the data store(s) 150 can be derived and/or updated using ML algorithms that are applied to porting results (e.g., successful or unsuccessful) and user-supplied mappings. In these embodiments, the mappings or recommendations can be generated according to the corresponding ML algorithms.

In addition, or alternatively, the mapping can be at least partially manual or user-guided. In these scenarios, the user can supply mappings that are, for example, missing, or revise existing mappings. In some of these scenarios, the user can be prompted to supply mappings which are not provided in the mapping configurations in the data store(s) 150. For example, the user can be prompted to map a structure, tag, or business rules in the instruction set for the first bot which does not appear in the mapping configurations in the data store(s) 150. Similarly, the user can be prompted to map a structure, tag, or business rule for which an automatically generated or recommended mapping fails to satisfy a configurable confidence threshold. Other examples will be apparent to one skilled in the art after a detailed review of the present disclosure.

At block 314, the bot porting module 142 performs a quality check on the second bot from the block 312. In some embodiments, the block 314 can include the bot porting module 142 reviewing, analyzing and modifying the new instruction set based on specific security policy requirements or rules, for example, of a corresponding tenant of the bot control system 140. Such security policy requirements or rules can be stored in the data store(s) 150. In addition, or alternatively, the block 314 can include the bot porting module 142 temporarily deploying and testing the second bot in a sandboxed environment, so that the bot porting module 142 can monitor events and/or transactions of specific tasks and/or operations. In addition, or alternatively, the bot porting module 142 can verify that tasks or steps, which may be required by a security policy or rule, are present in the new instruction set.

In certain embodiments, the block 314 can include the bot porting module 142, or another module, performing some or all of the functionality of a compliance bot as described in U.S. patent application Ser. No. 16/286,037. U.S. patent application Ser. No. 16/286,037 is hereby incorporated by reference. In an example, the bot porting module 142 can connect, for example, to one or more of the computer systems 122 and/or one or more of the data sources 121, to ensure that adequate access control measures are activated. In some embodiments, the bot porting module 142 verifies, for example, that unique user identifications are utilized, emergency access procedures are implemented, automatic logoffs are implemented, various combinations thereof, and/ or the like. In another example, the bot porting module 142 can connect, for example, to one or more of the computer systems 122 and/or one or more of the data sources 121, to ensure that encryption is activated. In certain embodiments, the bot porting module 142 verifies that the second bot connects to a resource, such as one of the computer systems 122 or data sources 121, utilizing the required encryption as determined by security policy or rule.

In some embodiments, the bot porting module 142 can audit logs at the block 314. For example, the bot porting module 142 can audit logs for activity indicative of the automated activity performed by the second bot to ensure proper encryption and security controls are in place. In another example, the bot porting module 142 audits the logs to verify connections are from, for example, a certain pre-determined internet protocol (IP) block and/or that the connections are on an authorized communications port. In some embodiments the bot porting module 142 can be configured to audit the second bot based on domain-specific compliance.

At block 316, the bot porting module 142 performs a license check on the second bot. In various embodiments, as part of the block 316, the bot porting module 142 can verify that the second bot is properly licensed for execution using the second RPA platform via, for example, valid runtime license, developer license, combinations of the foregoing and/or the like. In some cases, valid licensing can be verified, for example, via communication with a license database or licensing data in the data store(s) 150. In some cases, the bot porting module 142 can automatically obtain valid license(s) when necessary. In addition, or alternatively, the bot porting module 142 can prompt the user to verify or correct licensing.

At block 318, the bot porting module 142 generates an RPA porting report. In various embodiments, the RPA porting report can indicate unmapped bot configurations or elements of the instruction set for the first bot, problems indicated via the quality check from the block 314, invalid licensing, combinations of the foregoing and/or the like.

At block 320, the bot porting module 142 publishes the RPA porting report to the user with a configuration interface (e.g., via the reporting module 146). In various embodiments, the bot porting module 142 can facilitate user configuration of the new instruction set for the second RPA platform. In some cases, the bot porting module 142, can enable the user to provide, for example, changes to tasks or steps (e.g., addition or deletion), task or step sequence, connectivity information, login credentials, and/or exception handling procedures. In addition, or alternatively, the bot porting module 142 can identify to the user specific changes or updates to satisfy, for example, the quality check form the block 314. In various embodiments, the block 320 can include re-executing the quality check, or portions thereof, to ensure satisfaction thereof.

At block 322, the bot porting module 142 causes the bot deployment module 144 to deploy the second bot on the second RPA platform. As part of the block 322, the bot deployment module 144 can cause the selected RPA platform to execute the bot, thereby executing a user-executed process as a robotic process. Following deployment, the bot can be considered one of the managed bots 120. At block 324, the bot porting module 142 causes the bot manager 145 to initiate bot management, for example, by monitoring the bot as one of the managed bots 120 and/or by publishing a configuration interface that enables management of the bot on the second RPA platform.

At block 326, the bot porting module 142 records data related to the process 300 in the data store(s) 150. In various embodiments, the block 326 exits prior to termination of the process 300, even when the process 300 terminates without deployment or is user-terminated. The block 326 can include recording, for example, success or failure of the port in relation to the first and second RPA platforms. In a typical embodiment, this data related to success or failure can be used in subsequent executions, for example, of the feasibility analysis at block 304.

For simplicity of description, the process 300 is described relative to a single port of a single bot. In various embodiments, the command received, for example, at the block 302, can relate to a plurality of bots that are to be ported, for example, so as to consolidate those bots with a single platform. In various embodiments, the process 300 can proceed in parallel with respect to each such bot. In some embodiments, the bots can be queued for porting as resources become available for additional iterations of the process 300. In addition, or alternatively, the process 300 can be executed in parallel, and/or in a queued fashion, so as to facilitate porting of multiple different bots to multiple different RPA platforms in response to multiple different commands. Other variations will be apparent to skilled in the art after a detailed review of the present disclosure.

In addition, or alternatively, the block 326 can include recording each user-configured mapping or revision of an instruction set or other bot configuration. As described previously, such data can be used in a ML algorithm so as to improve future mappings and transformations during bot creation, for example, at the block 312. After block 326, the process 300 ends.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments, are possible in which these tasks are performed by a different entity.

Conditional language used herein, such as, among others. "can," "might." "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method of robotic process automation (RPA), the method comprising, by a computer system:
   receiving a command to port a first bot from a first RPA platform to a second RPA platform, wherein the first bot executes a robotic process in a computing environment provided by a particular computer system using the first RPA platform;
   executing a porting feasibility analysis relative to the first RPA platform and the second RPA platform, wherein the executing the porting feasibility analysis comprises:
      examining stored mapping configurations that map from the first RPA platform to the second RPA platform, wherein the mapping configurations are stored prior to receiving the command to port the first bot; and
      determining that porting is possible based on a determination that the stored mapping configurations include mappings for the first RPA platform and the second RPA platform in satisfaction of porting criteria;
   responsive to the determining that porting is possible, extracting bot configurations for the first bot from the first RPA platform, the bot configurations comprising an instruction set that at least partially defines the robotic process;
   creating a second bot for the second RPA platform, the creating comprising transforming the instruction set to a format of the second RPA platform; and
   deploying the second bot on the second RPA platform, wherein the deployed second bot executes the robotic process.

2. The method of claim 1 comprising providing a feasibility output to a user, wherein the feasibility output comprises a user option.

3. The method of claim 2, wherein the user option is selected from the group consisting of:
   a user option to terminate the port; and
   a user option to identify a different RPA platform for the second RPA platform.

4. The method of claim 1, wherein the porting feasibility analysis reaches a conclusion that automatic porting is possible.

5. The method of claim 1, wherein the porting criteria specifies one or more configuration elements that must be mapped, in the stored mapping configurations, to each of the first RPA platform and the second RPA platform.

6. The method of claim 1, wherein the porting feasibility analysis reaches a conclusion that porting is possible with manual configuration.

7. The method of claim 1, wherein the executing the porting feasibility analysis comprises examining results of prior porting attempts from the first RPA platform to the second RPA platform.

8. The method of claim 1, wherein the extracting bot configurations comprises:
   extracting connectivity information for the particular computer system;
   extracting login credentials for the particular computer system; and
   extracting an exception handling procedure for the first bot.

9. The method of claim 1, wherein the extracting the bot configurations comprises accessing stored configuration settings indicative of at least one of a specific location, path, or interface for the bot configurations.

10. The method of claim 9, wherein the extracting comprises retrieving at least some of the bot configurations via the stored configuration settings.

11. The method of claim 1, wherein the creating the second bot for the second RPA platform comprises:
    translating the instruction set to an intermediate instruction set in an intermediate format; and
    translating the intermediate instruction set to a new instruction set in the format of the second RPA platform.

12. The method of claim 1, wherein the creating the second bot for the second RPA platform is performed at least partially automatically using stored mapping configurations for the first RPA platform and the second RPA platform.

13. The method of claim 1, wherein the creating the second bot for the second RPA platform is at least partially user-guided via user-supplied mappings.

14. The method of claim 1 comprising, prior to the deploying:
    generating an RPA porting report comprising an indication of unmapped configurations of the first bot; and
    publishing the RPA porting report to a user with a configuration interface that enables user configuration of the second bot.

15. The method of claim 1, comprising initiating bot management of the second bot on the second RPA platform.

16. The method of claim 1, comprising:
    recording data related to the port, wherein the recorded data comprises an indication of a success or failure of the port and information related to user configuration of the second bot; and
    applying a machine learning algorithm to at least a portion of the recorded data.

17. The method of claim 1, comprising:
    wherein the command relates to a plurality of bots to be ported to the second RPA platform; and
    executing ports of the plurality of bots in parallel.

18. The method of claim 1, comprising queuing a plurality of ports of a plurality of bots.

19. A computer system comprising a processor and memory, wherein the processor and the memory in combination are operable to implement a method comprising:
- receiving a command to port a first bot from a first RPA platform to a second RPA platform, wherein the first bot executes a robotic process in a computing environment provided by a particular computer system using the first RPA platform;
- executing a porting feasibility analysis relative to the first RPA platform and the second RPA platform, wherein the executing the porting feasibility analysis comprises:
  - examining stored mapping configurations that map from the first RPA platform to the second RPA platform, wherein the mapping configurations are stored prior to receiving the command to port the first bot; and
  - determining that porting is possible based on a determination that the stored mapping configurations include mappings for the first RPA platform and the second RPA platform in satisfaction of porting criteria;
- responsive to the determining that porting is possible, extracting bot configurations for the first bot from the first RPA platform, the bot configurations comprising an instruction set that at least partially defines the robotic process;
- creating a second bot for the second RPA platform, the creating comprising transforming the instruction set to a format of the second RPA platform; and
- deploying the second bot on the second RPA platform, wherein the deployed second bot executes the robotic process.

20. A computer-program product comprising a non-transitory computer-usable medium having computer-readable program code embodied therein, the computer-readable program code adapted to be executed to implement a method comprising:
- receiving a command to port a first bot from a first RPA platform to a second RPA platform, wherein the first bot executes a robotic process in a computing environment provided by a particular computer system using the first RPA platform;
- executing a porting feasibility analysis relative to the first RPA platform and the second RPA platform, wherein the executing the porting feasibility analysis comprises:
  - examining stored mapping configurations that map from the first RPA platform to the second RPA platform, wherein the mapping configurations are stored prior to receiving the command to port the first bot; and
  - determining that porting is possible based on a determination that the stored mapping configurations include mappings for the first RPA platform and the second RPA platform in satisfaction of porting criteria;
- responsive to the determining that porting is possible, extracting bot configurations for the first bot from the first RPA platform, the bot configurations comprising an instruction set that at least partially defines the robotic process;
- creating a second bot for the second RPA platform, the creating comprising transforming the instruction set to a format of the second RPA platform; and
- deploying the second bot on the second RPA platform, wherein the deployed second bot executes the robotic process.

* * * * *